United States Patent
Biskeborn et al.

(10) Patent No.: US 8,564,902 B2
(45) Date of Patent: *Oct. 22, 2013

(54) MAGNETIC HEAD WITH COMPONENTS SEPARATED BY INSULATIVE PORTIONS AND ELECTRICALLY COUPLED TOGETHER BY CONNECTIVE ELEMENT

(75) Inventors: Robert Glenn Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,722

(22) Filed: Jun. 25, 2012

(65) Prior Publication Data
US 2012/0262819 A1 Oct. 18, 2012

Related U.S. Application Data

(63) Continuation of application No. 12/027,927, filed on Feb. 7, 2008, now Pat. No. 8,248,727.

(51) Int. Cl.
*G11B 5/265* (2006.01)

(52) U.S. Cl.
USPC .......................................................... 360/121

(58) Field of Classification Search
USPC ........................... 360/121, 241.1, 241.2, 316
See application file for complete search history.

(56) References Cited

U.S. PATENT DOCUMENTS

| | | | |
|---|---|---|---|
| 4,802,043 A * | 1/1989 | Sato et al. ...................... 360/316 |
| 5,237,476 A | 8/1993 | Bischoff et al. |
| 5,450,264 A | 9/1995 | Nishimura et al. |
| 5,790,353 A * | 8/1998 | Miwa et al. ............... 360/125.01 |
| 6,445,538 B1 | 9/2002 | McKinstry et al. |
| 6,577,469 B2 | 6/2003 | Kennedy et al. |
| 6,914,756 B2 | 7/2005 | Molstad et al. |
| 7,027,264 B1 | 4/2006 | Subrahmanyam et al. |
| 7,099,117 B1 | 8/2006 | Subrahmanyam et al. |
| 7,239,488 B2 | 7/2007 | Zhu et al. |
| 7,630,173 B2 * | 12/2009 | Biskeborn ..................... 360/129 |
| 7,760,465 B2 | 7/2010 | Koeppe |
| 8,248,727 B2 * | 8/2012 | Biskeborn et al. ............ 360/121 |
| 2009/0201613 A1 | 8/2009 | Biskeborn et al. |

OTHER PUBLICATIONS

Restriction/Election Requirement from U.S. Appl. No. 12/027,927 dated Apr. 19, 2011.

(Continued)

*Primary Examiner* — Brian Miller
(74) *Attorney, Agent, or Firm* — Zilka-Kotab, PC

(57) ABSTRACT

A magnetic head in one embodiment includes a plurality of components separated from each other by insulative portions, one of the components being a substrate; at least one connective element electrically coupling the components together; and a chiplet having at least one of read transducers and write transducers. A magnetic head in another embodiment includes a plurality of components separated from each other by insulative portions; side bars flanking the substrate; and at least one connective element electrically coupling the components together. A magnetic head in another embodiment includes a plurality of components separated from each other by insulative portions; and at least one connective element electrically coupling the components together, wherein the at least one connective element is positioned in at least one of the insulative portions, the at least one connective element having no other function than to electrically connect the components adjacent thereto.

17 Claims, 6 Drawing Sheets

(56) References Cited

OTHER PUBLICATIONS

Non-Final Office Action Summary from U.S. Appl. No. 12/027,927 dated Oct. 14, 2011.

Final Office Action Summary from U.S. Appl. No. 12/027,927 dated Feb. 22, 2012.

Notice of Allowance and Fee(s) Due from U.S. Appl. No. 12/027,927 dated Apr. 11, 2012.

* cited by examiner

MAGNETIC HEAD WITH COMPONENTS SEPARATED BY INSULATIVE PORTIONS AND ELECTRICALLY COUPLED TOGETHER BY CONNECTIVE ELEMENT

RELATED APPLICATIONS

This application is a continuation of U.S. Pat. No. 8,248,727, which is herein incorporated by reference.

BACKGROUND

The present invention relates to magnetic head structures, and more particularly, this invention relates to magnetic head structures having one or more interconnects for eliminating electrical potential differences between magnetic head components.

This invention addresses performance degradation in magnetic heads comprised of two or more electrically conductive or dissipative but isolated tape bearing portions. For example, in current full span tape head modules, an insulative adhesive layer is used for bonding closure to the thin film stack portion of the device chip, which contains the magnetic read, write and servo elements, as shown in FIG. 1. Thus, the closure and chip are electrically isolated. Usually the chip itself is connected to ground or other reference voltage in the tape drive, leaving the closure floating. Tape running can then lead to significant closure charging resulting in electrical potential difference between substrate and closure of up to 10 s of volts. This is known to contribute to such problems as shorting, alumina pitting, accumulation of adherent debris and others. To prevent closure charging, a device is needed for connecting closure and substrate, thus effectively clamping them at the same potential.

Shorting can be caused by electrical potential differences between conductive components of a magnetic tape head module. Shorting can cause the magnetic head module to malfunction temporarily in the time frame of the short, or cease to operate at all in severe instances of shorting. This is an undesirable effect for the application of reading and writing data to tape, as data can be distorted, destroyed, or recorded/read incorrectly because of the short.

Pitting is a problem encountered in the metals comprising a magnetic tape head module. Pitting is a type of localized corrosion in which metal that is subjected to the conditions that cause pitting develops small holes. Pitting corrosion may be caused by a deficit of oxygen. The area subjected to a lack of oxygen tends to become anodic while the area with an excess of oxygen tends to become cathodic. This leads to galvanic corrosion of the metal around the area of low oxygen.

An accumulation of adherent debris can be caused by potential electrical differences between magnetic tape head module components. This is due to the nature of certain particulate contaminants which are easily polarized to carry a charge. When the charged particle approaches the charged components of the magnetic tape head module, they are attracted to the component and will adhere to the surface, reducing the effectiveness of the component.

BRIEF SUMMARY

A magnetic head in one embodiment includes a plurality of components separated from each other by insulative portions, one of the components being a substrate; at least one connective element electrically coupling the components together; and a chiplet having at least one of read transducers and write transducers.

A magnetic head according to another embodiment includes a plurality of components separated from each other by insulative portions; side bars flanking the substrate; and at least one connective element electrically coupling the components together.

A magnetic head in yet another embodiment includes a plurality of components separated from each other by insulative portions; and at least one connective element electrically coupling the components together, wherein the at least one connective element is positioned in at least one of the insulative portions, the at least one connective element having no other function than to electrically connect the components adjacent thereto.

Storage systems in various embodiments include a magnetic head as recited above; a drive mechanism for passing a magnetic recording tape over the magnetic head; and a controller in communication with the head.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
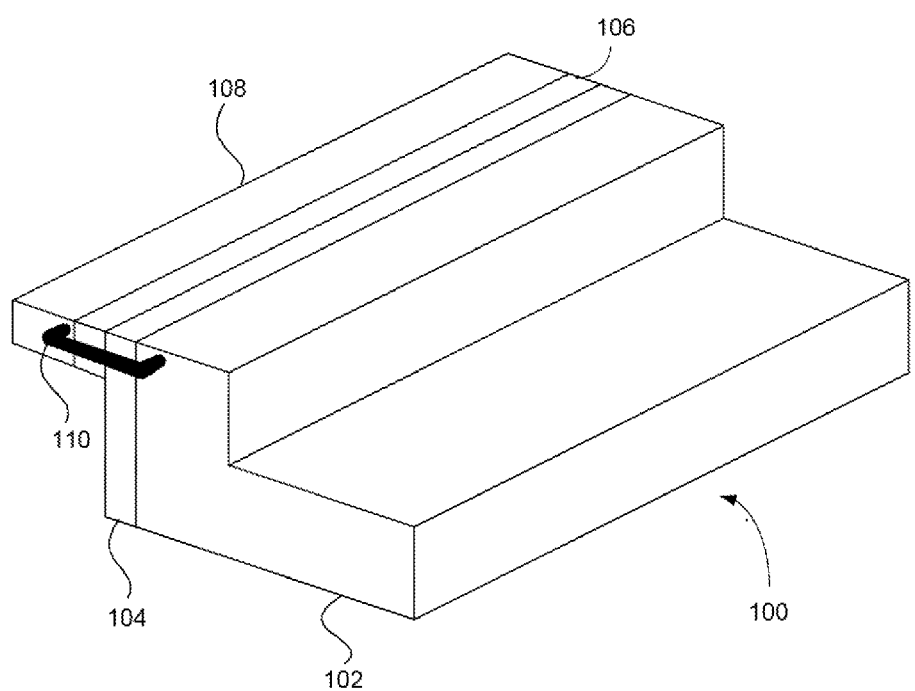
FIG. 1 shows a traditional magnetic tape head, with a full span closure and a connective element according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. The following description discloses several preferred embodiments of a magnetic head system, as well as operation and/or component parts thereof.

The embodiments described below disclose a new head design that reduces or eliminates electrical potential differences between components of the magnetic head. This is accomplished by equipping the head with a novel type of interconnect, described as a connective element below. In current full span tape head modules, and in many of the embodiments presented herein, an insulative adhesive layer is used for bonding the closure to the thin film stack portion of the device chip, which contains the magnetic read, magnetic write, and magnetic servo transducers.

If the head has components that are dissipative, the connective element serves to reduce the charge buildup on such components.

In a general embodiment of the invention, a magnetic head is comprised of a plurality of components separated from each other by insulative portions and at least one connective element couples the components together. The components may include a substrate and a closure, and the closure may be a full span closure. Further, a chiplet may be positioned towards the closure, with the chiplet having at least one of: a read transducer and a write transducer, or any combination thereof. A chiplet can be an independently formed chip separate from the substrate, or a chip formed on the substrate but not extending full span (i.e., the full span of the magnetic medium passing thereacross).

In any embodiment, the components may include a substrate, closure, and/or a chiplet. Also, side bars may flank the substrate. The magnetic head may also include a full span closure, and the side bars may form part of a tape bearing surface of the head.

The connective element may be conductive, semiconductive, dissipative, etc. In one approach, the connective element includes a wire or wires bonded to an exterior surface of the head. Also, an interface of the wire and the components may be characterized as having a structure resulting from ultrasonic bonding of the wire to the components. Further, the components may have pads formed thereon, with the connective element possibly being coupled to the pads.

In another embodiment, the connective element further includes a conductive, semi-conductive or dissipative film and a bridge comprising an adhesive with an electrically conductive, semi-conductive or dissipative material therein cured on an exterior of the head. The connective element may be positioned in at least one of the insulative portions, with the connective element having no other function than to electrically connect the components adjacent thereto.

Another embodiment is a magnetic tape head comprised of a substrate, a closure separated from the substrate by an insulative portion (which may be a contiguous portion or a plurality of non-contiguous portions), and at least one connective element coupling the substrate and closure together. This structure may further include a chiplet positioned towards the closure, with the chiplet having at least one of: a read transducer and a write transducer, or any combination thereof. Further, side bars can flank the substrate, and the connective element may include a wire bonded to an exterior surface of the head.

In another embodiment, a magnetic storage system includes a magnetic tape head which comprises a substrate forming a portion of a flat tape bearing surface, a closure separated from the substrate by an insulative portion, the closure forming a portion of the flat tape bearing surface, a chiplet positioned towards the closure, the chiplet having at least one of read transducers and write transducers, with at least one connective element coupling the substrate and closure together, the connective element being selected from a group consisting of a wire bonded to an exterior surface of the head, a conductive, semi-conductive or dissipative film bonded to an exterior surface of the head, and a conductive, semi-conductive or dissipative bridge bonded to an exterior surface of the head, a drive mechanism for passing a magnetic recording tape over the head, and a controller in communication with the head.

FIG. 1 shows an embodiment of the invention including a full span magnetic tape head module 100 with substrate 102, thin film layer 104 comprising the device chip, adhesive layer 106, and closure 108. In this arrangement, the thin film layer 104 and closure 108 are electrically isolated from each other, absent the connective element 110. The thin film layer 104 can be grounded in the tape drive or elsewhere, but the closure 108 would otherwise be isolated. As tape runs along the surface of the magnetic tape head, the closure 108 can become significantly charged, possibly resulting in electrical potential difference between the closure 108 and substrate 102 of several 10 s of volts. This may lead to such problems as shorting, alumina pitting, accumulation of adherent debris, etc. To prevent closure 108 charging, an connective element 110 is placed on the surface of the closure 108 and substrate 102 which effectively clamps each component at the same electrical potential.

In another embodiment, a connective element 110 can be a wire or group of wires (which are typically gold or platinum, but can comprise any conductive, semi-conductive or dissipative material), which may be ultrasonically bonded to the components of the head but can be attached in another method such as soldering, pressure contacting, etc. Also, the connective element 110 can be a conductive, semi-conductive or dissipative film such as copper tape or a conductive, semi-conductive or dissipative polymer film. Further, one may also use wire in conjunction with any of these conductive, semi-conductive or dissipative films.

Another embodiment of the invention uses epoxy or fluid containing silver, gold, and/or platinum (or any other conductive, semi-conductive or dissipative material) as a bridge to act as a connective element 110 which could be cured to the tape head module in contact with the components to be protected alone or in contact with the components and insulative components of the tape head module simultaneously.

A further embodiment uses plastics or ceramics to form the bridge that is the connective element 110. The connective element 110 can be located on any side of the magnetic head module, and does not have to be placed on the side as shown in FIG. 1. Any of these connective elements can be used alone or in conjunction with any other types of connective elements to electrically connect the magnetic head components.

Figure 2:
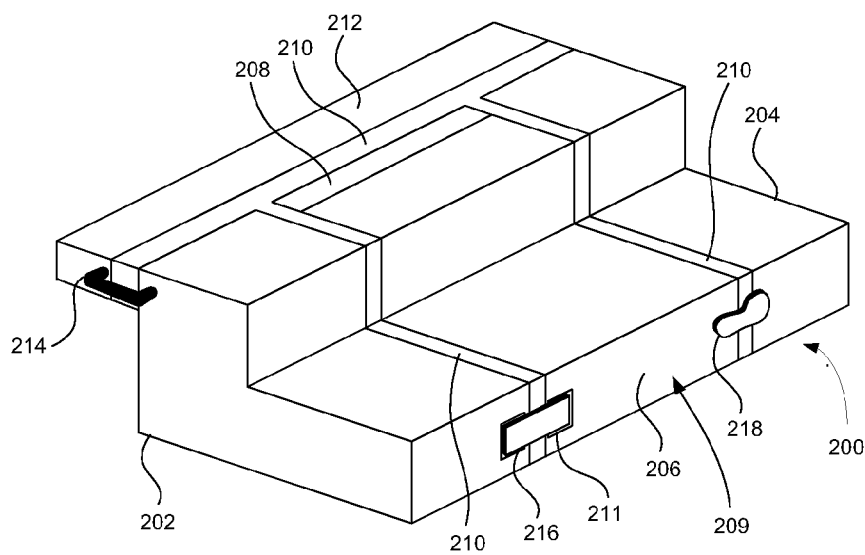
FIG. 2 shows a magnetic tape head with a full span closure and side bars, with three connective elements of different types according to one embodiment.

In FIG. 2, a specific embodiment of a magnetic head 200 is shown which has three different types of connective elements 214, 216, and 218. Also shown in FIG. 2 are side bars 202 and 204, substrate 206, thin film layer 208, adhesive layer 210, and closure 212. In this embodiment, the substrate 206 and thin film layer 208 which together form a chiplet 209 are positioned towards and isolated from the closure 212 by the adhesive layer 210. Also, the thin film layer 208 and substrate 206 are flanked by side bars 202 and 204. These side bars 202 and 204 may be electrically connected with the closure 212 by use of one or more connective elements 214. The side bars 202 and 204 may also be electrically connected to the substrate 206 through use of one or more connective elements 216 and 218. By electrically connecting the substrate 206 to the closure 212, potential electric differentials will be eliminated between the magnetic head components. The thin film layer 208 include a plurality of readers and/or writers (read transducers and/or write transducers), such as the readers and writers 506 of the thin film layer shown in FIGS. 5 and 6, and discussed below.

Connective element 214 is indicative of a wire-style interconnect which can be formed from one or more connective wires made from materials such as copper, silver, gold, etc. Connective element 216 is indicative of a tape-style interconnect which can be made from any conductive metal or conductive, semi-conductive or dissipative polymer film, such as copper tape, silver tape, etc. Connective element 218 is indicative of a bridge-style or film interconnect which can be made from epoxy, resin, solder, etc. comprised of any conductive, semi-conductive or dissipative material (such as silver, gold, platinum, etc.), and can be used alone or in conjunction with any other interconnect styles. Each of the connective elements can be used in any position on the magnetic head module as long as it electrically connects the magnetic head modules together so as to eliminate or reduce potential differentials between the magnetic head components. The positioning of the specific types of connective elements shown in FIG. 2 is not indicative of a required position or embodiment, and is for illustrative purposes only. Accordingly, the connection can be made anywhere, and preferably in locations that will not interfere with the movement of the tape relative to the head. Further, the components may have pads 211 formed thereon, with the connective element possibly being coupled to the pads.

Figure 3:
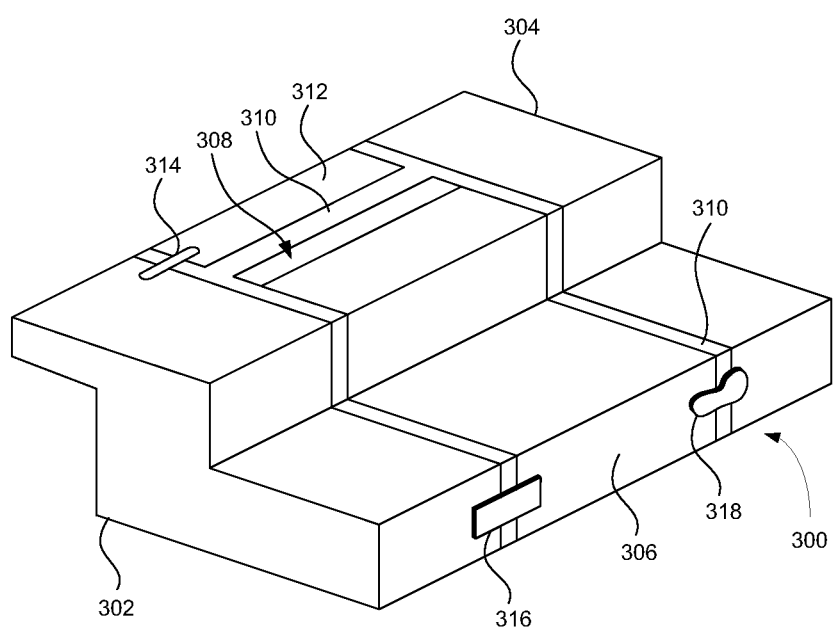
FIG. 3 shows a magnetic tape head with side bars and three connective elements of different types according to one embodiment.

FIG. 3 shows an embodiment 300 that does not have a full span closure, but where the side bars 302 and 304 extend flush with the closure 312. The connective elements 314, 316, and 318 are again representative of three different styles: wire, tape, and bridge, respectively. Once again, the position of the connective elements is for illustrative purposes only, and the element should be placed such that an electrical connection is formed between the magnetic head components. The closure 312 is isolated from the substrate 306 by an adhesive layer 310. To eliminate electrical potential differences between the bead module components, connective elements 314, 316, and 318 are used to electrically connect all the head components. The closure 312 is electrically connected to the side bar 302 by connective element 314, side bar 302 is electrically connected to the substrate 306 by connective element 316, and substrate 306 is electrically connected to side bar 304 by connective element 318, thus eliminating any electrically potential differences between side bars 302 and 304, closure 312 and substrate 306. Connective element 314 is illustrative of a recessed-type connective element, where the surface of the magnetic head module components that are being electrically connected by element 314 are recessed an amount to allow the connective element 314 to sit in the recess and optionally not protrude above the magnetic head module component surface. Any connective element (including wire, tape, and bridge) may be used in this fashion, and may be positioned on any of the magnetic head module components that are to be electrically connected. The positioning of the connective elements can be shifted for any reason such as easier production of the magnetic head module, clearance of the tape, etc. Further, as noted above, a chiplet 308 may be positioned towards the closure, with the chiplet having at least one of: a read transducer and a write transducer, or any combination thereof, e.g., as the readers and writers 506 of the thin film layer shown in FIGS. 5 and 6, and discussed below. A chiplet can be an independently formed chip separate from the substrate and coupled thereto (as shown), or a chip formed on the substrate but not extending full span (i.e., the full span of the magnetic medium passing thereacross).

Figure 4:
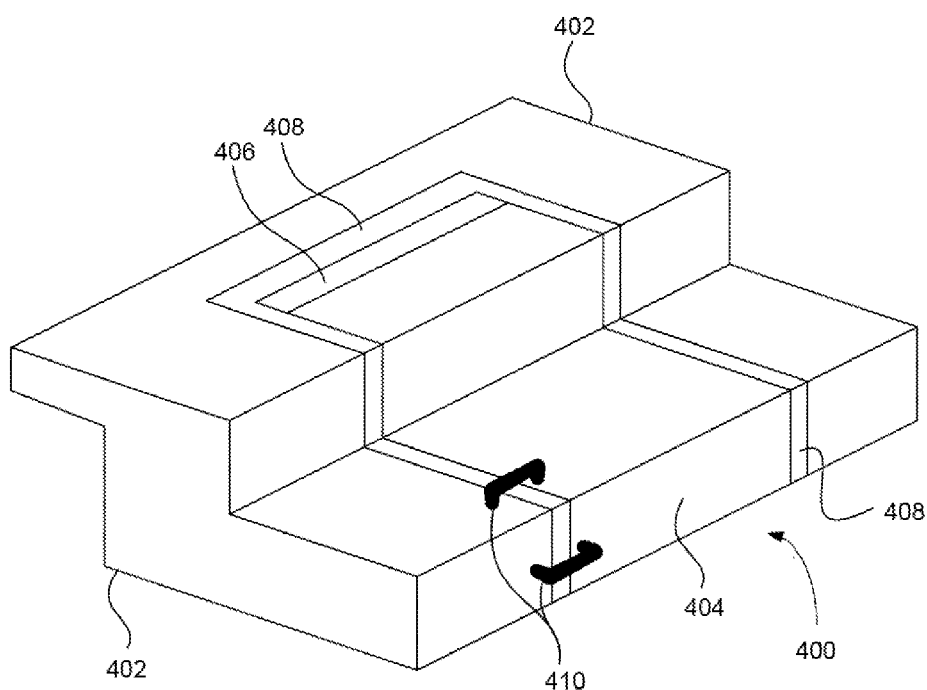
FIG. 4 shows a magnetic tape head with a continuous closure/side bar combination and a connective element according to one embodiment.

FIG. 4 is an illustrative representation of another embodiment 400. In this figure, the side bars and closure form a single unit 402 which wraps around the substrate 404 and thin film layer 406, but is electrically isolated from each by an adhesive layer 408. In this example, two connective elements 410 are used to electrically connect the substrate 404 (which is in electrical contact with the thin film layer 406, or the thin film layer 406 may be formed from the substrate 404). In this and any other embodiment, connective elements 410 can be used in parallel to electrically connect the magnetic head components. In case one connection fails, the other will be able to keep the magnetic head components in electrical contact with each other to eliminate electrical potential differences. This duplicative approach can be applied any time a backup connection is desired in case one connection fails due to reasons such as jarring of the module, shock, overheating, pulse damage, improper construction or bonding, etc.

Figure 5:
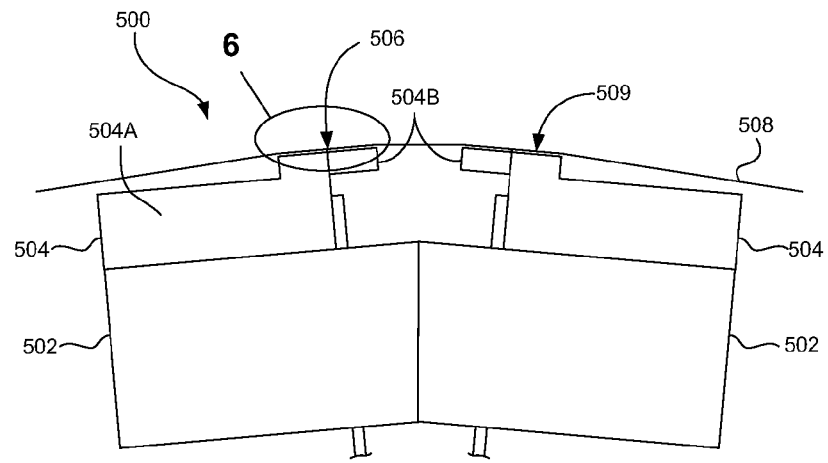
FIG. 5 illustrates a specific embodiment comprised of a flat-lapped magnetic tape head.

FIG. 5 shows an example of a flat-lapped bi-directional, two-module magnetic tape head 500. As shown, the head includes a pair of bases 502, each equipped with a module 504. The bases are typically "U-beams" that are adhesively coupled together. Each module 504 includes a substrate 504A and a closure 504B with at least one thin film layer comprised of readers and writers 506 situated therebetween. In use, a tape 508 is moved over the modules 504 along a tape bearing surface 509 in the manner shown for reading and writing data on the tape 508 using the readers and writers 506. Conventionally, a partial vacuum is formed between the tape 508 and the tape bearing surface 509 for maintaining the tape 508 in close proximity with the readers and writers 506.

Figure 6:
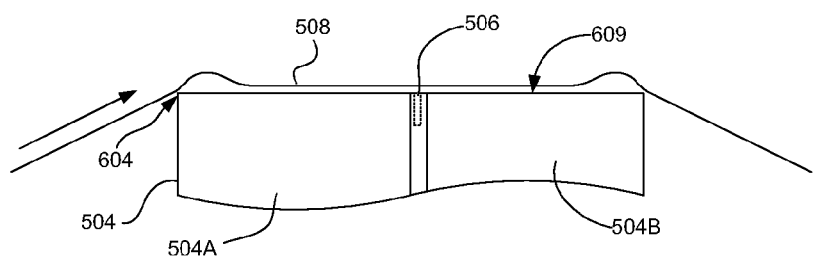
FIG. 6 is an enlarged view of Circle 6 of FIG. 5, showing a tape running across a surface of a magnetic head module.

FIG. 6 is an enlarged view of the area encircled in FIG. 5. FIG. 6 illustrates a close-up of the head 500 of FIG. 5. When the tape 508 moves across the head as shown, air is skived from below the tape 508 by a skiving edge 604 of the substrate 504A, and instead of the tape 508 lifting from the tape bearing surface 609 of the module (as intuitively it should), the reduced air pressure in the area between the tape 508 and the tape bearing surface 609 allows atmospheric pressure to urge the tape towards the tape bearing surface 609.

Figure 7:
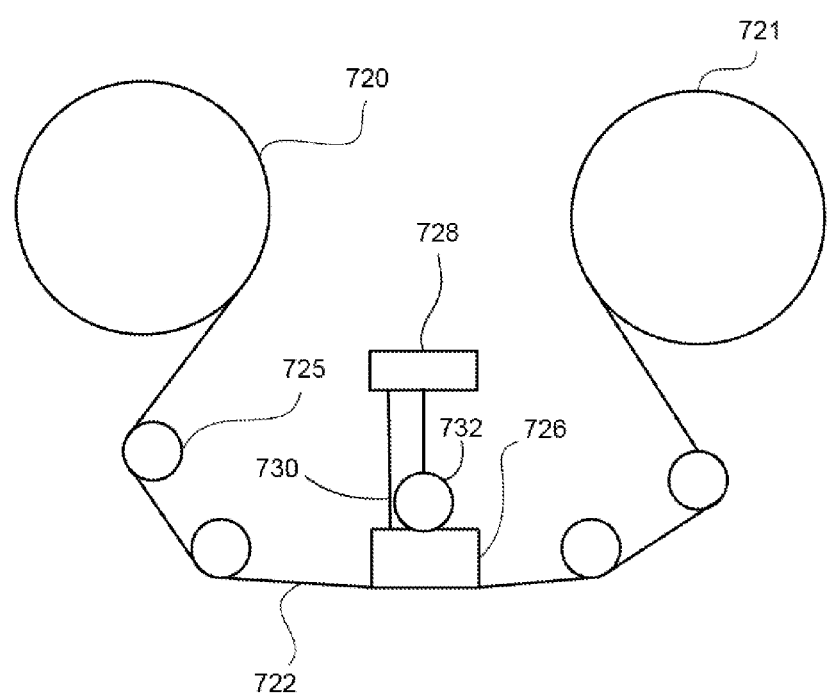
FIG. 7 is a schematic diagram of a simplified tape drive system according to one embodiment.

FIG. 7 illustrates a simplified tape drive which may be employed in the context of the present invention. While one specific implementation of a tape drive is shown in FIG. 7, it should be noted that the embodiments of the previous figures may be implemented in the context of any type of tape drive system.

As shown, a tape supply cartridge 720 and a take-up reel 721 are provided to support a tape 722. These may form part of a removable cassette and are not necessarily part of the system. Guides 725 guide the tape 722 across a preferably bidirectional tape head 726, of the type disclosed herein. Such tape head 726 is in turn coupled to a controller assembly 728 via an MR connector cable 730. The controller 728, in turn, controls head functions such as servo following, write bursts, read functions, etc. An actuator 732 controls position of the head 726 relative to the tape 722.

A tape drive, such as that illustrated in FIG. 7, includes drive motor(s) to drive the tape supply cartridge 720 and the take-up reel 721 to move the tape 722 linearly over the head 726. The tape drive also includes a read/write channel to transmit data to the head 726 to be recorded on the tape 722 and to receive data read by the head 726 from the tape 722. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Further, particular features described herein can be used in combination with other described features in each and any of the various possible combinations and permutations. Thus, the breadth and scope of a preferred embodiment should not be limited by any of the above-described exemplary embodiments, but should be defined only in accordance with the following claims and their equivalents.

What is claimed is:

1. A magnetic head, comprising:
   a plurality of components separated from each other by insulative portions, one of the components being a substrate;
   at least one connective element electrically coupling the components together, the at least one connective element being coupled to an exterior surface of the components coupled thereto; and
   a chiplet having at least one of a plurality of read transducers and a plurality of write transducers, wherein the chiplet is an independently formed chip formed separate from the substrate.

2. A magnetic head as recited in claim 1, wherein the at least one connective element includes a wire bonded to the exterior surface of the components coupled thereto.

3. A magnetic head as recited in claim 2, wherein an interface of the wire and the components is characterized as having a structure resulting from ultrasonic bonding of the wire to the components.

4. A magnetic head as recited in claim 2, wherein the components have pads formed thereon, the at least one connective element being coupled to the pads.

5. A magnetic head as recited in claim 1, wherein the at least one connective element includes a conductive, semiconductive or dissipative film coupled to the-exterior surface of the components coupled thereto.

6. A magnetic head as recited in claim 1, wherein the at least one connective element includes a bridge comprising an adhesive with an electrically conductive, semi-conductive or dissipative material therein cured on the exterior surface of the components coupled thereto.

7. A magnetic head as recited in claim 1, wherein the at least one connective element is positioned in at least one of the insulative portions, the at least one connective element having no other function than to electrically connect the components adjacent thereto.

8. A storage system, comprising:
   a magnetic head as recited in claim 1;
   a drive mechanism for passing a magnetic recording tape over the magnetic head; and
   a controller in communication with the head.

9. A magnetic head, comprising:
   a plurality of components separated from each other by insulative portions, one of the components being a substrate;
   at least one connective element electrically coupling the components together; and
   a chiplet having at least one of a plurality of read transducers and a plurality of write transducers, wherein the chiplet is an independently formed chip formed separate from the substrate,
   wherein the components include a closure coupled to the substrate, the at least one connective element being coupled to an exterior surface of the components coupled thereto.

10. A magnetic head as recited in claim 9, wherein the closure is a full span closure.

11. A magnetic head as recited in claim 9, further comprising side bars flanking the substrate.

12. A magnetic head as recited in claim 11, wherein the closure is a full span closure.

13. A magnetic head as recited in claim 11, wherein the side bars form part of a tape bearing surface of the head.

14. A storage system, comprising:
   a magnetic head as recited in claim 9;
   a drive mechanism for passing a magnetic recording tape over the magnetic head; and
   a controller in communication with the head.

15. A magnetic head, comprising:
   a plurality of components separated from each other by insulative portions, one of the components being a chiplet;
   side bars flanking the chiplet; and
   at least one connective element electrically coupling the components together, the at least one connective element being coupled to an exterior surface of the components coupled thereto.

16. A magnetic head as recited in claim 15, further comprising a closure having part of a tape bearing surface of the head, the chiplet having another portion of the tape bearing surface of the head, wherein the at least one connective element electrically connects the closure and the chiplet.

17. A storage system, comprising:
   a magnetic head as recited in claim 15;
   a drive mechanism for passing a magnetic recording tape over the magnetic head; and
   a controller in communication with the head.

* * * * *